(12) United States Patent
Sethi et al.

(10) Patent No.: US 8,301,697 B2
(45) Date of Patent: Oct. 30, 2012

(54) ADAPTIVE STREAMING OF CONFERENCE MEDIA AND DATA

(75) Inventors: Aaron C. Sethi, Bellevue, WA (US); Arun Prasad Jayandra, Redmond, WA (US); Parker Shaw, Sammamish, WA (US); Mathrubootham Janakiraman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

(21) Appl. No.: 12/485,471

(22) Filed: Jun. 16, 2009

(65) Prior Publication Data

US 2010/0318606 A1 Dec. 16, 2010

(51) Int. Cl.
*G06F 15/16* (2006.01)
*H04N 7/14* (2006.01)
*H04N 7/167* (2006.01)
*H04L 12/28* (2006.01)
*H04L 15/16* (2006.01)

(52) U.S. Cl. ........ 709/204; 709/203; 709/219; 709/231; 709/238; 348/14.08; 348/14.09; 348/14.1; 348/14.12; 370/254; 370/260; 370/261; 380/200; 380/201; 380/217; 380/228; 380/239

(58) Field of Classification Search .................. None
See application file for complete search history.

(56) References Cited

U.S. PATENT DOCUMENTS

| | | | | |
|---|---|---|---|---|
| 5,546,461 A * | 8/1996 | Ibaraki et al. | ................. | 380/217 |
| 5,933,500 A * | 8/1999 | Blatter et al. | ................. | 380/200 |
| 6,016,348 A * | 1/2000 | Blatter et al. | ................. | 380/228 |
| 6,292,842 B1 * | 9/2001 | Crouch et al. | ................. | 719/329 |
| 6,624,841 B1 * | 9/2003 | Buchner et al. | ............. | 348/14.1 |
| 6,980,498 B2 * | 12/2005 | Sako | .......................... | 369/47.24 |
| 7,165,041 B1 * | 1/2007 | Guheen et al. | ................ | 705/26.1 |
| 2002/0131594 A1 * | 9/2002 | Hori et al. | ...................... | 380/201 |
| 2005/0007965 A1 * | 1/2005 | Hagen et al. | ................... | 370/260 |
| 2005/0122393 A1 * | 6/2005 | Cockerton | ................ | 348/14.12 |
| 2005/0169197 A1 | 8/2005 | Salesky et al. | | |
| 2005/0251832 A1 | 11/2005 | Chiueh | | |
| 2005/0283536 A1 | 12/2005 | Swanson et al. | | |
| 2006/0010197 A1 * | 1/2006 | Ovenden | ....................... | 709/204 |
| 2006/0059213 A1 * | 3/2006 | Evoy | ............................. | 708/135 |
| 2006/0072663 A1 * | 4/2006 | Li et al. | .................... | 375/240.16 |
| 2006/0112188 A1 * | 5/2006 | Albanese et al. | ............ | 709/238 |
| 2006/0167985 A1 * | 7/2006 | Albanese et al. | ............ | 709/203 |
| 2006/0211425 A1 * | 9/2006 | Bae et al. | ....................... | 455/445 |
| 2006/0245378 A1 * | 11/2006 | Jeong et al. | ................... | 370/261 |
| 2006/0245379 A1 * | 11/2006 | Abuan et al. | .................. | 370/261 |
| 2007/0044017 A1 * | 2/2007 | Zhu et al. | ....................... | 715/530 |
| 2007/0171841 A1 * | 7/2007 | Witzel et al. | .................. | 370/254 |

(Continued)

OTHER PUBLICATIONS http://www.movenetworks.com/wp-content/uploads/move-simulcode-product-sheet.pdf Move Simulcode—Move networks (1 page).

(Continued)

*Primary Examiner* — Ario Etienne
*Assistant Examiner* — Ho Shiu
(74) *Attorney, Agent, or Firm* — Workman Nydegger

(57) ABSTRACT

A distributed system for distributing conferencing data such as video, audio, and other conference data. The distributed system includes a conference data dispatch system, multiple conference participant computing systems, and a network distribution path through which conference data may be distributed from the conference data dispatch system to the various conference participant computing systems. The conference data is segmented. Each segment is encoded to be suitable to a particular class of participant computing systems. The encoded segments may be cached in an intermediary computing system to thereby avoid a strict unicast model for distributing conference data.

12 Claims, 6 Drawing Sheets

U.S. PATENT DOCUMENTS

| | | | |
|---|---|---|---|
| 2007/0186002 A1* | 8/2007 | Campbell et al. | 709/231 |
| 2007/0203945 A1* | 8/2007 | Louw | 707/104.1 |
| 2007/0294263 A1* | 12/2007 | Punj et al. | 707/10 |
| 2008/0100694 A1* | 5/2008 | Barkley et al. | 348/14.08 |
| 2008/0104171 A1 | 5/2008 | Berberian et al. | |
| 2008/0158339 A1* | 7/2008 | Civanlar et al. | 348/14.09 |
| 2008/0273079 A1* | 11/2008 | Campbell et al. | 348/14.08 |
| 2009/0228808 A1* | 9/2009 | MacDonald et al. | 715/756 |
| 2010/0057886 A1* | 3/2010 | Dodge | 709/219 |
| 2010/0066805 A1* | 3/2010 | Tucker et al. | 348/14.08 |

OTHER PUBLICATIONS

Streaming Video: A Look behind the Scenes http://www.cultivate-int.org/issue4/scenes/ By Jim Strom—May 2001—(11 pages ).

Web Server vs. Streaming Server http://www.microsoft.com/windows/windowsmedia/compare/webservvstreamserv.aspx Windows Media—(4 pages).

ARMS : Adaptive Rich Media Secure Streaming http://Its4www.epfl.ch/~frossard/publications/pdfs/acmmm03-demo.pdf MM'03, Nov. 2-8, 2003, Berkeley, California, USA (2 pages).

SMART: An Efficient, Scalable, and Robust Streaming Video System http://www.hindawi.com/getpdf.aspx?doi=10.1155/s1110865704310218 EURASIP Journal on Applied Signal Processing 2004;2, 192-206 2004 (15 pages).

Research and Design of a Mobile Streaming Media Content Delivery Network http://www.hpl.hp.com/techreports/2003/HPL-2003-77.pdf Apr. 14, 2003—Susie Wee, John Apostolopoulos, Wai-tian Tan, Sumit Roy (5 pages).

* cited by examiner

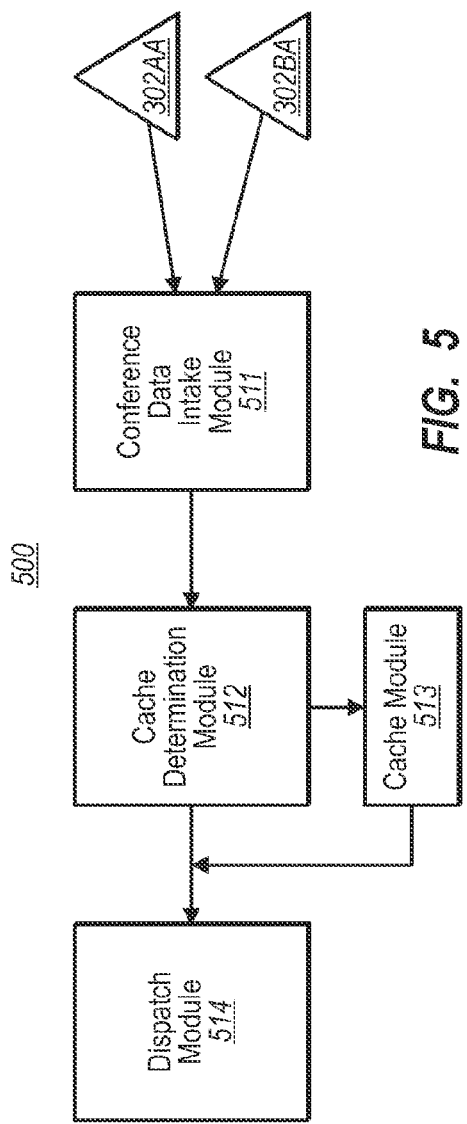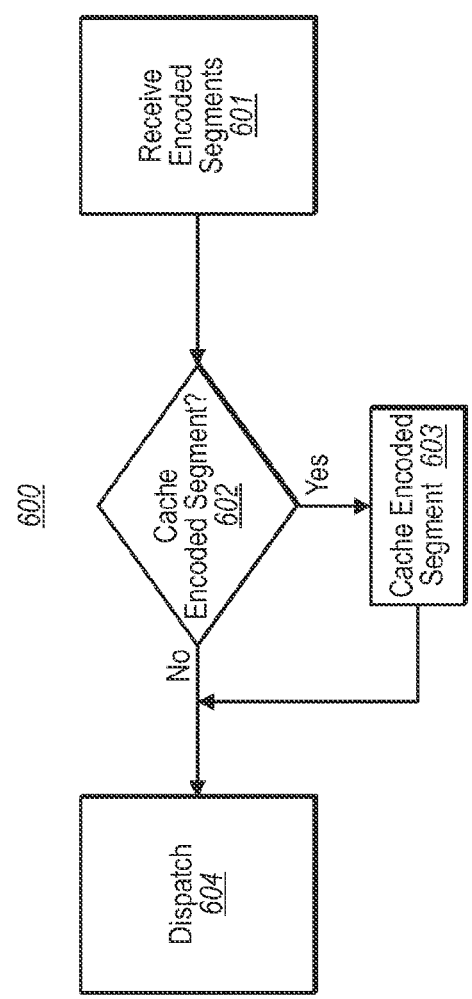

ADAPTIVE STREAMING OF CONFERENCE MEDIA AND DATA

BACKGROUND

Web conferencing is used to conduct live meetings or presentations via the Internet. In such a web conference, multiple participant computers are connected to each other via the Internet. Each participant computer may have one or more conferencing individuals associated therewith. One, some or all of the participant computers may be capable of consuming conferencing information. One some or all of the participant computers may be capable of providing conference information. Furthermore, one, some or all of the participant computers may be capable of both consuming and providing conferencing information. A conferencing service gathers the conference information provided by the participant computers, and redistributes the conference information to the participant computers as appropriate.

Conferencing information might include, for example, video and audio information. However, conferencing information might also include other types of data. For instance, slide decks, images, white board data, simulations, and other types of data may also be communicated as part of the conference. As the web conference is conducted, participant computers thus upload conferencing information to a conferencing clearing house, which then redistributes the conferencing information to other participant computers as appropriate. Sometimes, it is necessary to flow conferencing information security.

Current conference/event solutions needing to connect and flow conferencing information securely between participant computers do so via unicasting. In other words, there is a dedicated connection for flowing conferencing information from the conference service to each participant computer that consumes conference information. Unicasting is advantageous in some respects as it allows the conference service to deal uniquely with the varied bandwidth and reliability of each participant computer.

BRIEF SUMMARY

Embodiments described herein relate to a distributed system for distributing conferencing data such as video, audio, and other conference data such as application sharing data. The distributed system includes a conference data dispatch system, multiple conference participant computing systems, and a network distribution path through which conference data may be distributed from the conference data dispatch system to the various conference participant computing systems.

According to one embodiment, the conference data dispatch system includes a conference data identification module that identifies conference data that represents the physical conference held between conference participants. A segmentation module segments the conference data. An encoding module then encodes the segments into multiple encoded segments, each representing an encoded version of the corresponding segment that is encoded according to a particular encoding setting. A matching module identifies which of the encoded segments of each of the segments is to flow to which corresponding conference participant. A distribution module causes the identified encoded segment to be flowed to the conference participant computing systems as directed by the matching module.

In one embodiment, the distributed system includes a conferencing data caching system interposed within a particular network distribution path between the conference data dispatch system and multiple conference participant computing systems. The conference data caching system might include a conference data intake module that receives the encoded segments that were flowed from the conference data dispatch system along the particular network distribution path towards the conference data caching system. A caching determination module determines for each received encoded segment, whether or not to cache the encoded segment. A caching module caches each received encoded segment that is determined by the caching determination module to be cached. A dispatch module dispatches at least some of the received encoded segments to a corresponding conference participant computing system further along the particular network distribution path.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 5 illustrates modules of a conference data caching computing system that might act as an example of the conference data caching computing systems of FIG. 1;

FIG. 6 illustrates a flowchart of a method for intermediating conference data in accordance with the principles described herein;

DETAILED DESCRIPTION

The principles described herein may be used in any distributed conferencing system that flows conference data from at least one conference data dispatch system to multiple conference participant computing systems. Conferencing participant computing systems in any given conference may be as few as one, but as many as potentially thousands, or even perhaps millions in the future. The principles described herein are not limited to the particular number of conferencing participants. As the number of participating conference participant computing systems increases, however, the principles described herein can become increasingly beneficial in conserving bandwidth, processing, and other important computing resources. Nevertheless, FIG. 1 is provided as an example physical conference data distributed system 100 in which the principles described herein may be employed.

Figure 1:
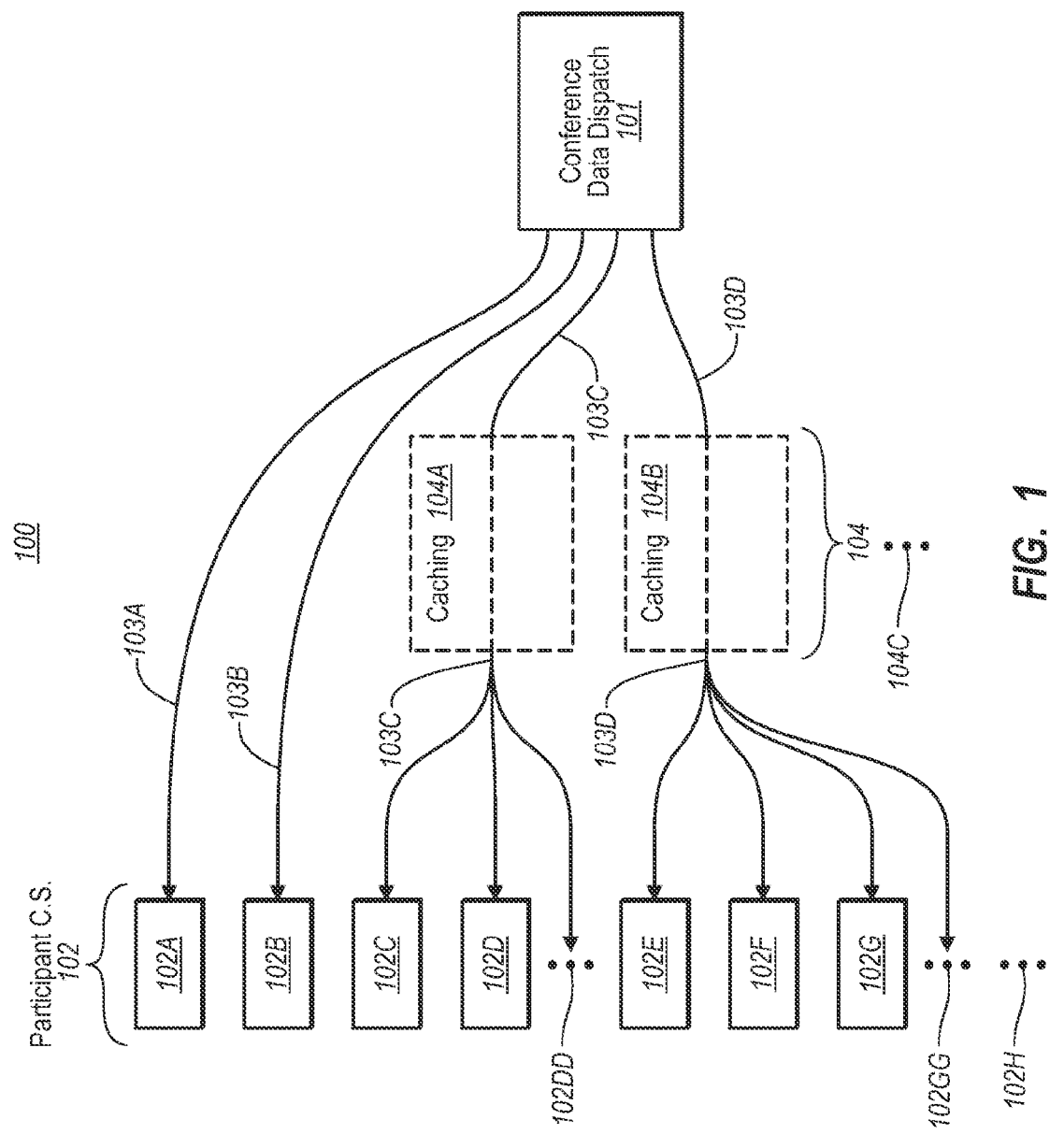
FIG. 1 illustrates a physical conferencing data distributed system that includes a single conference data dispatch system that dispatches conference data to multiple conference participant computing systems.

FIG. 1 illustrates a physical conferencing data distributed system 100 that includes a single conference data dispatch system 101 and multiple conference participant computing systems 102. Each conference participant computing system 102 is capable of rendering at least some of the conference data. However, there might be a wide disparity in capabilities from one computing system to another. For instance, there might be one participant whose associated conference participant computing system is a cell-phone with limited viewing area and connected to the Internet only via a relatively slow Internet connection, and perhaps even has a weak cellular signal. On the other hand, other conference participant computing systems might have panoramic view capability, have many audio zones, with full application sharing capability, and might have dedicated fiber-optic connection directly to the Internet backbone. Thus, the various capabilities of the conference participant computing systems may vary widely. Nevertheless, each is able to render conference data to a certain degree.

Stated differently, each conference participant computing system may be capable of rendering the audio of a conference, but perhaps at different sampling rates. Some might render audio in stereo, or perhaps in some form of surround sound or other multiple-zone audio. Alternatively or in addition, each conference participant might render video to varying abilities. For instance, some conference participant computing systems might not be able to render video at all. Others may have lower or higher resolution levels. The computing systems might have different aspect ratios. Some computing systems might even be able to render panoramic views. Each conference participant computing system might also be able to engage in application sharing activities to varying degrees. For instance, some might be able to render slide decks, while others might not. Some might be able to render whiteboard sharing, and others might not, and so forth. Some might even be able to render conferencing information unconventionally such as, for example, using brail machines to render text information to the visually impaired. In this description, the "rendering" of video data means displaying video data, the "rendering" of audio data means the sounding of audio data, and the "rendering" of application sharing or other conference data means the communication of such data so as to communicate information to the conference participant.

The conference data dispatch system 101 accesses conference data that is to be distributed to the conference participant computing systems. There may be multiple conference data dispatch systems that perform that function, with perhaps just one, some, or perhaps all of the conference data dispatch systems employing the principles described herein. Nevertheless, to keep this description straightforward and easier to understand, the physical conferencing data distributed system 100 is illustrated as having only one conference data dispatch system 101, though the principles may be extended to systems that have multiple conference data dispatch systems 101, as will be apparent to those of ordinary skill in the art after having read this description.

Furthermore, the physical conference data distributed system 100 is illustrated as having seven conference participant computing systems 102 (including conference participant computing systems 102A, 102B, 102C, 102D, 102E, 102F and 102G). However, there may be other numbers of computing systems as mentioned above. Furthermore, the conference participant computing systems may register into and unregister from a conference in the middle of a conference. Accordingly, the ellipsis 102H represents that there may be any number of conference participant computing systems, and that this number may vary during the conference itself.

There are a number of distribution paths from the conference data dispatch system 101 to each of the conference participant computing systems 102. Those distributions paths include distribution paths 103A, 103B, 103C and 103D, which may be collectively be referred to as "distribution paths 103". For instance, unicast distribution path 103A provides conference data to the conference participant computing system 102A. Also, unicast distribution path 103B provides conference data to the conference participant computing system 103B.

However, the other illustrated distribution paths 103C and 103D are not unicast at all. Instead, distribution path 103C provides conference data from the conference data dispatch system 101 to a conference data caching system 104A, which is interposed within the network distribution path 103C between the conference data dispatch system 101 and the conference participant computing systems 102C and 102D. At some point (either immediately or after perhaps some delay), the conference data caching system 104A then provides the conferencing data to one or more of several conference participant computing systems 102C and 102D that are served by the conference data caching system 104A. The ellipsis 102DD represents that there may be one or more other conference participant computing systems that the conference data caching system 104A serves.

In this case, although not required, there are multiple conference data caching systems. Distribution path 103D provides conference data from the conference data dispatch system 101 to a conference data caching system 104B that is interpositioned within the distribution path 103D. At some point, the conference data caching system 104B provides the conferencing data to one or more of several conference participant computing systems 102E, 102F and 102G that it serves. The ellipsis 102GG represents that there may be other numbers of conference participant computing systems that the conference data caching system 104B serves. Furthermore, the ellipsis 104C represents that there may be other numbers of conference data caching computing systems that support additional distribution paths.

Figure 2B:
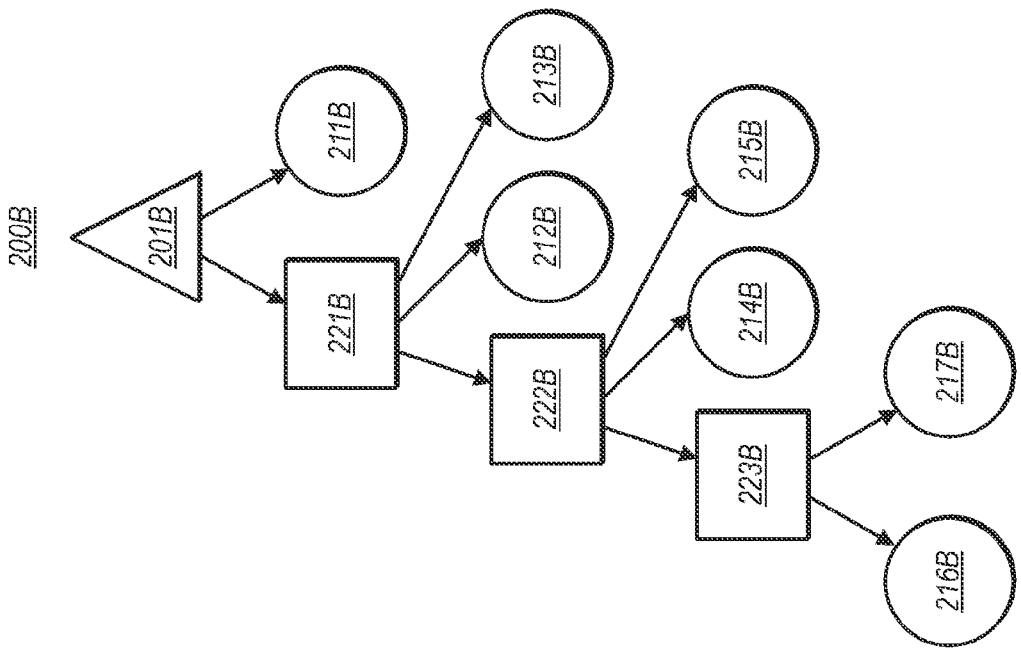
FIG. 2B illustrates a second example hierarchy of conference data caching computing systems interpositioned between a conference data dispatch system and conference participant computing systems.
Figure 2A:
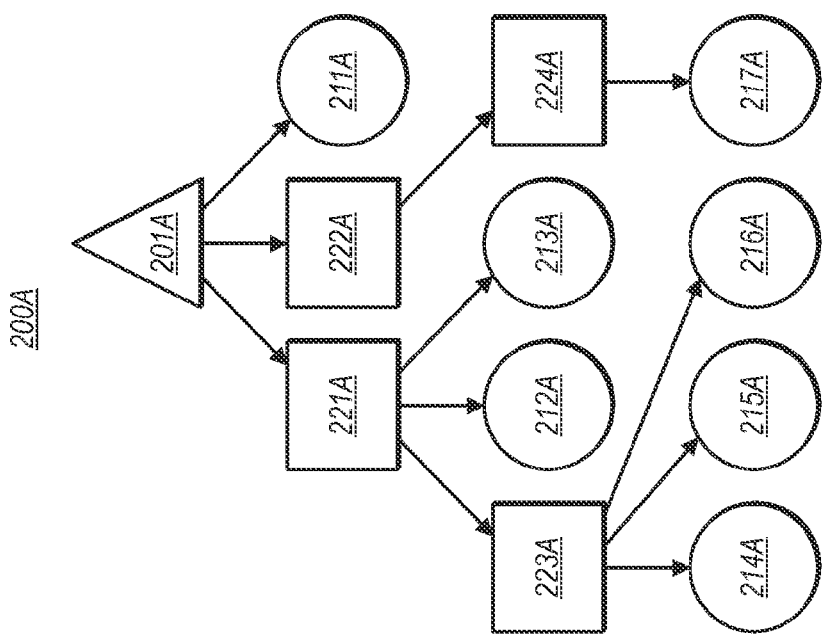
FIG. 2A illustrates one example hierarchy of conference data caching computing systems interpositioned between a conference data dispatch system and conference participant computing systems.

In one embodiment, there may be multiple conference data caching computing systems arranged hierarchically. FIGS. 2A and 2B illustrates two 200A and 200B of an infinite number of possible hierarchical structures of conference data caching computing systems. In each hierarchy 200A and 200B, a root node 201A and 201B, respectively, (represented symbolically as triangles) represents the corresponding conference data dispatch system. The leaf nodes 211A through 217A and 211B through 217B, respectively, (symbolized as circles) represent conference participant computing systems. The intermediate nodes 221A through 223A and 221B through 224B, respectively, (symbolized as squares) represent conference data caching computing systems.

Note that the conference data dispatch system may provide conference data to one or multiple conference data caching systems, and that each conference data caching system may provide conference data directly to any number of conference participant computing systems, and may provide conference data directly to any number of other conference data caching systems. There may also be multiple tiers of conference data caching computing systems. For example, in FIG. 2A, there are two tiers of conference data caching computing systems. In FIG. 2B, there are three tiers of conference data caching systems. In the context of the topology of the Internet, there could be any number of hierarchies of conference data caching computing systems, with any number of tiers of conference data caching computing systems. Each of the computing systems 101, 102 and 104 of FIG. 1 are physical computing systems that are connected to each other as described through a physical network. In one embodiment, that physical network may span the Internet. An example of a physical computing system that may be employed as any of the computing systems 101, 102 and 104 of FIG. 1 is described below with respect to the computing system 800 of FIG. 8.

Figure 3:
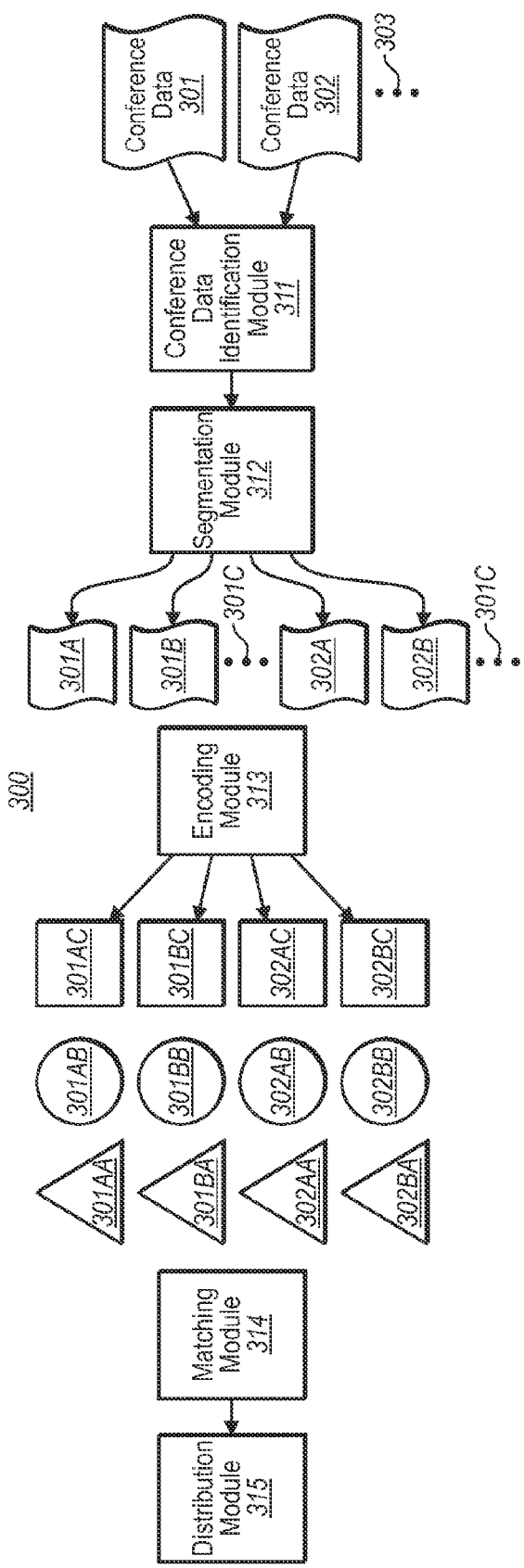
FIG. 3 illustrates modules of the conference data dispatch system that represents one example of the conference data dispatch system of FIG. 1.
Figure 4:
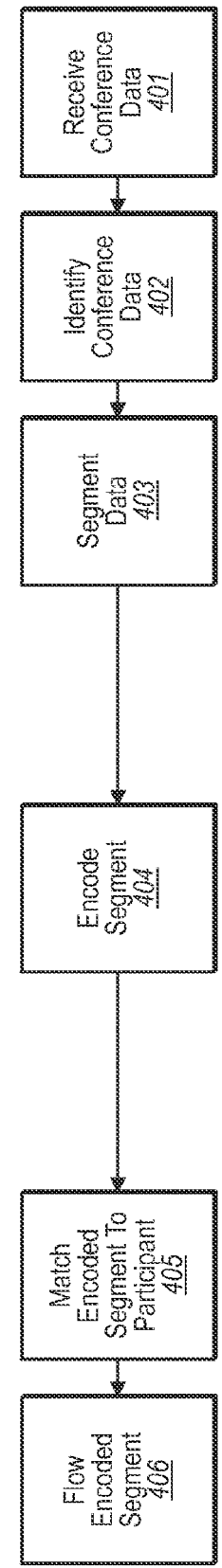
FIG. 4 illustrates a flowchart of a method for dispatching conference data in accordance with the principles described herein.

FIG. 3 illustrates the conference data dispatch system 300. The conference data dispatch system 300 may be an example of the conference data dispatch system 101 of FIG. 1. FIG. 4 illustrates a flowchart of a method 400 for dispatching conference data. As the method 400 may be performed by the conference data dispatch system 300, the various modules of the conference data dispatch system 300 will now be described with respect to FIGS. 3 and 4 in conjunction.

Referring to FIG. 3, a conference data identification module 311 receives conference data (see act 401 of FIG. 4). As previous mentioned, the conference data may be a video data, audio data, or other conference data (such as electronic slide deck data, application sharing data, electronic white board session data, question and answers session data, and so forth). As conferencing technology advances, there may be other types of conferencing data that is sent for communication to conference participants as well. The conference data encompasses any such data.

In FIG. 3, the conference data identification module 311 is illustrated as receiving conference data 301 and 302. However, the ellipsis 303 represents that there might be other conference data received as well. The conference data might be packaged according to a particular schema and might include a combination of video, audio, and other conference data, or might contain just a subset of that data, or perhaps even just one of video, audio or other conference data.

The conference data identification module 311 is just one of many modules illustrated and described with respect to FIGS. 3 and 5. Such modules are physical modules. For example, the modules might be hardware modules dedicated to performing a particular task exclusively, or perhaps after proper configuration and/or under certain circumstances. Alternatively, the modules might be general-purpose modules (such as a computer memory) that are configured to perform the described task in response to the execution of computer-executable instructions. An example of such a computer memory will be described below with respect to the computing system 800 of FIG. 8. In some cases, modules illustrated as being separate in FIGS. 3 and 5 may be the same physical module. For instance, if the module was a dedicated special-purpose module, the modules might be physical subcomponents of a larger module. In that case, the passage of data from one subcomponent module to another subcomponent modulate may be performed inside the larger physical module. If the module were a general-purpose module (such as a computer memory), the data may be passed from one sub-component module to another via an application program interface.

The conference data identification module 311 identifies the conference data as such (act 402), not necessarily by labeling the conference data as such, but by at least recognizing the conference data as being conference data. For example, if the conference data dispatch system only accesses conference data, the conference data is implicitly identified. The conference data represents a physical interaction between conference participants. At least some of the conference participants are participating via a physical network using corresponding conference participant computing systems.

Returning to FIG. 3, a segmentation module 312 is structured to segment the conference data (including the video, audio and other conference application data) into segments (act 403). For instance, segments 301A, 301B and potentially other segments 301C are segmented from the conference data 301. Segments 302A, 302B and potentially other segments 302C are segmented from the conference data 301. The number of segments will depend on the size of the conference data, and the desired size of each of the segments. In some cases, perhaps there will be only one segment corresponding to conference data. In other cases, there might be thousands, or even millions, of segments corresponding to a particular piece of conference data. However, for simplicity, each of the conference data 301 and 302 is illustrated as being segmented into two segments each.

Returning to FIG. 3, an encoding module 313 is structured to encode at least some of the segments into multiple encoded segments (act 404). Each encoded segment represents an encoded version of the corresponding segment that is encoded according to a particular encoding setting. As an example, encoded segments 301AA, 301BA, 302AA and 302BA are obtained by encoding respective segments 301A, 301B, 302A and 302B according to a particular set of encoding settings. Since they were encoded using the same set of encoding settings, they are all symbolized using a common shape, a triangle. Continuing the example, encoded segments 301AB, 301BB, 302AB and 302BB are obtained by encoding respective segments 301A, 301B, 302A and 302B according to another set of encoding settings. In this case, the common encoding settings are represented by each encoded segment having a circle shape. Completing the example, encoded segments 301AC, 301BC, 302AC and 302BC are obtained by encoding respective segments 301A, 301B, 302A and 302B according to yet another set of encoding settings. In this case, the common encoding settings are represented by each encoded segment having a square shape.

Thus, in FIG. 3, each of the segments is subjected to the same three encoding settings so that three distinct encoded segments are generated by the encoding module 313 for each segment received by the encoding module 313. Nevertheless, the principles described herein are not limited to any particular number of encoded segments generated for each segment. In some cases, one segment may result in fewer encoded segments while another segment may result in a greater number of encoded segments. Furthermore, there is no requirement that one segment be encoded using the same encoding settings used to encode another segment. For instance, one segment might be encoded into two encoded segments using encoding settings A and encoding settings B, while another segment might be encoded into four encoded segments using encoding settings B, encoding settings C, encoding settings D, and encoding settings E. If there were no overlapping encoding settings, then the latter segment might be encoded into four encoded segments using encoding settings C, D, E and F.

The following provides some examples of some different encoding settings, and class of conference participant computing system that the encoding setting might best serve.

The segment might be encoded to a certain bit rate setting. Lower bit rates might be more appropriate for participants who have a lower bandwidth connection, or perhaps have a lower video refresh rate, resolution, and/or video size. Lower bit rates might be more appropriate for participants who have limited available processing power to process the incoming conference stream. In one embodiment, the conference participant computing system may dynamically monitor its ability to handle certain bit streams, and request lower or higher bit rate conference streams as appropriate. Participants with greater bandwidth, display, and processing capabilities may request higher bit rate encoded segments to more fully utility their capabilities to maximize performance.

The segments might be encoded to a particular display setting. For example, there might be segments encoded for different screen sizes or resolutions, or perhaps based on whether the display is progressive scan or interlaced. As one example, there might be encoded segments that encoded a panoramic view that may be consumed by participants that have the capability to render a panoramic view. On the other hand, there might be segments of the same conference, but with lower refresh rate and resolution, for participants connected via a small personal digital assistant. There might also be encoded segments of the conference with no video at all to accommodate a few individuals who are just listening into the conference with a device that has little or no display capability. On the other hand, a participant might be working from their home on another project and have the conference window minimized. In that case, if there is no need for the home computer to record the video, the home computer might request encoded segments with no video at all.

Another example of encoded settings includes security settings. As an example, a subset or all of the conference participants might have a shared key that is used to decrypt the conference contents. Accordingly, there might be encoded segments that are encrypted using a particular encryption key, some encoded segments that require some other validation of the conference participant computing system, and some encoded segments that do not use encryption or validation at all.

Compression might also be used as an encoding setting. Certain participants might be capable of decompression only encoded segments that have been compressed using a certain technology, or might not be capable of decompressing at all. Participants with abundant decompression capabilities, but with limited bandwidth, might request encoded segments for which full compression has been employed. Participants with high bandwidth might elect to request uncompressed encoded segments.

There are a wide variety of other encoding settings that might be employed. For example, sample rate and format rate might be appropriate encoding settings. The principles described herein are not limited to the types of encoding settings, nor to the number of encoding settings applied to a particular set of encoded segments.

Returning to FIG. 3, for some or all of the conference participant computing systems, and for at least some of the conference time, a matching module 314 is structured to identify which of the encoded segments to flow to the corresponding conference participant computing system (act 405). As an example, the matching module 314 might use some knowledge obtained during a conference registration process to determine the best set of encoded segments to send to a particular conference participant computing system (or conference data caching computing system) at a particular point in time. In one embodiment, the particular conference participant computing system (or conference data caching computing system) requests the particular encoding settings of interest at initial conference registration time, and may update the request as conditions change throughout the conference.

The conference participant and/or conference data caching computing systems may be made known of the options for encoding settings via a manifest. Each segment of the conference data is then encoded according to each of the encoding settings published in the manifest. In one embodiment, the possible set of encoding settings may be changed dynamically during the conference. In that case, a new manifest showing the new options may be published during the conference as well. For instance, during the conference, the panoramic cameras may be disabled due to a technical malfunction. The manifest may be updated to notify the conference participant computing systems that encoded segments for panoramic video are no longer available, thereby allowing the conference participant computing systems to request a next-best alternative encoding setting.

As another example, typically a conference service's peak usage periods fall within core business hours. Thus, to avoid service-wide outages or users and conferences begin disconnected during these peak usage periods, enough hardware should be deployed to have adequate capacity for peak periods. The dynamic modification of the manifest allows the conference data dispatch and caching systems to degrade or disable low priority encoding modality while maintaining some level of service. Clients may receive a notification if or when a requested encoded segment/segment-bundle is unavailable at the time of the request.

Returning to FIG. 3, a distribution module 315 is structured to cause the identified encoded segment to be flowed (act 406) to the conference participant computing systems in the manner identified by the matching module 314.

As mentioned with respect to FIG. 1, the encoded segments may be sent in unicast mode directly to the conference participating computing systems. However, as a potentially efficient alternative, the encoded segments may instead be sent to some intermediary computing system (such as a proxy server or an enterprise server) that serves multiple conference participant computing systems. For instance, if a conference is of particular interest to a large enterprise, the intermediating enterprise server may serve thousands of conference participants.

FIG. 5 illustrates the conference data caching system 500 that might act as such an intermediating conference server. FIG. 6 illustrates a flowchart of a method 600 for intermediating conference data. The conference data caching system 500 will now be described with frequent reference to FIGS. 5 and 6. The conference data caching system 500 is an example of a conference data caching computing system 104 of FIG. 1.

A conference data intake module 511 is structured to receive encoded segments (act 601) dispatched by the conference data dispatch system or a prior conference data caching computing system. In the illustrated case, the conference data intake module 511 receives encoded segments 302AA and 302BA encoded by the encoding module 313 of FIG. 3. Returning to FIG. 5, a caching determination module 512 is structured to determine for each received encoded segment, whether or not to cache the encoded segment (decision block 602). If the encoded segment is to be cached (Yes in decision block 602), a caching module 513 is structured to cache each of those received encoded segments (act 603). The cached encoded segment may then be sent to multiple recipients including potentially conference participant computing system(s) and/or other conference data caching computing system(s). On the other hand, the encoded segment may be dispatched without caching at all. In either case, a dispatch module 514 is structured dispatch (act 604) the encoded segment further along the particular network distribution path (act 604) either to a single recipient, or to multiple recipients.

The conference data caching computing system may cache encoded segments of multiple different encoding settings. For instance, the system might cache encoded segments 302AA and 302BA to allow for delivery to multiple recipients, while immediately dispatching without caching encoded segments 302BA and 302BB to a single recipient.

Figure 7:
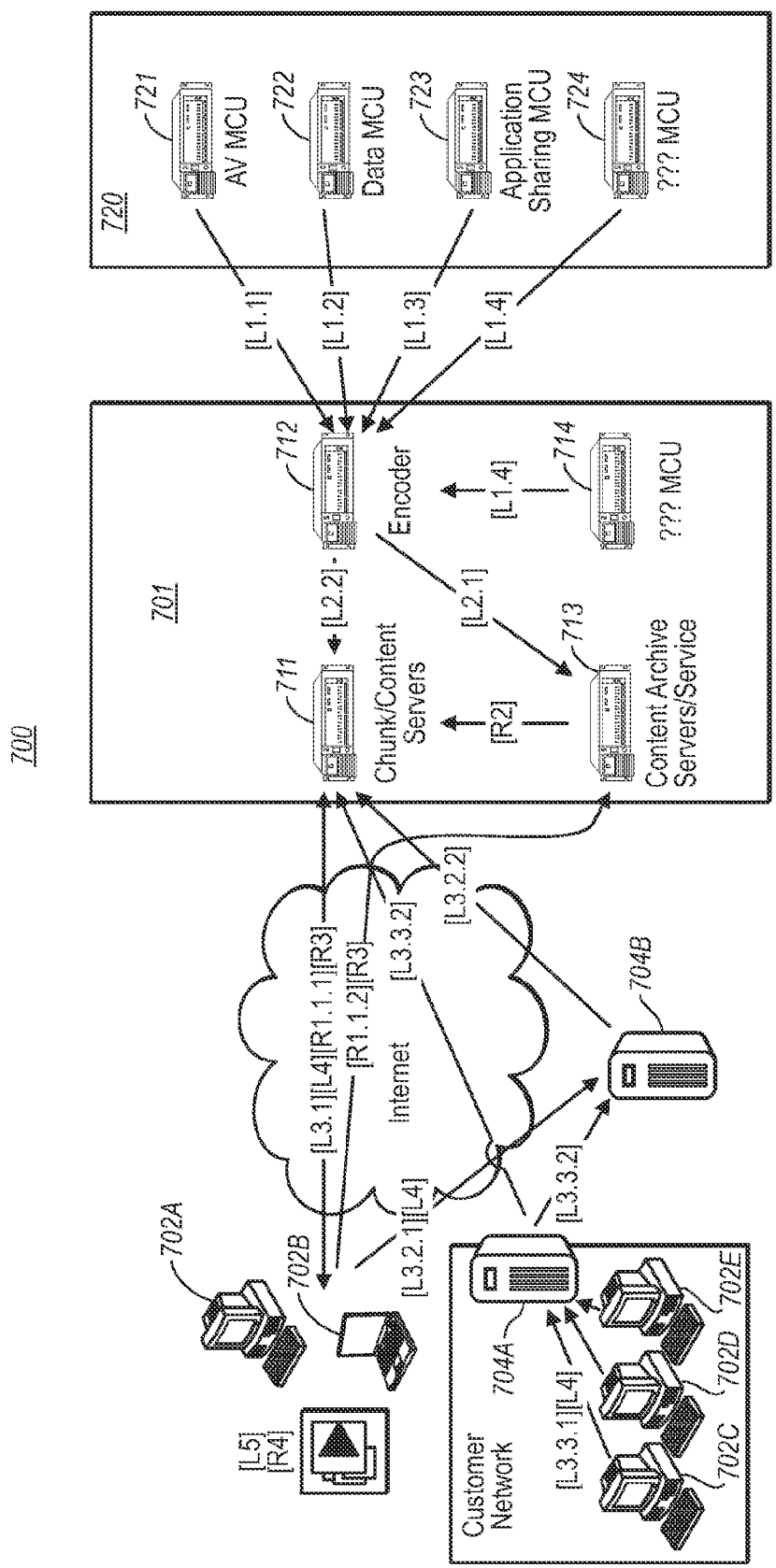
FIG. 7 illustrates a conference data distributed system that is just one example of the conference data distributed system of FIG. 1.

FIG. 7 illustrates a conference data distributed system 700 that is just one example of the conference data distributed system 100 of FIG. 1. In this example, the broadcasting conference service 701 of FIG. 7 is an example of the conference data dispatch system 101 of FIG. 1. In this specific example, the broadcasting conference servers 701 includes a chunk content server 711, an encoder server 712, a content archive servers/service 713, and an optional internal core media conference unit 714 that is internal to the broadcasting conference service 701. The computing systems 702A, 702B, 702C, 702D and 702E of FIG. 7 are examples of the conference participant computing systems 102 of FIG. 1. The network server 704A and the content distribution network servers 704B of FIG. 7 are examples of the conference data caching computing systems 104 of FIG. 1. The core conference server(s)/service 720 represents conference content providers including an audio-visual (AV) media conference unit 721, a data media conference unit 722, an application sharing media conference unit 723 and an additional optional media conference unit 724. The various actions [L1.1], L[1.2], L[1.3], L[1.4], L[2.1], L[2.2], L[3.1], L[3.2.1], L[3.2.2], L[3.3.1], L[3.3.2], L[4], L[5], R[1.1.1], R[1.1.2], R[2], R[3] and R[4] will now be described in this example.

First, the process of receiving, transcoding and repacking conference source streams/modalities into client compatible chunk enabled container(s) will be described.

In action L[1.1], one audio stream and one or more (and potentially many) video source streams are provided to the encoder 712. These streams may include samples encoded with real-time codecs such as MBR transcode RTAudio/(RTVideo|H.264). The encoder 712 transcodes these streams to client compatible codecs (e.g. WMA, VC1, H.264). Source video streams from the audio-visual media conference unit 721 may be switched video that can originate from different presenters sending differing frame size/rates/color-depth encoded with different formats.

In action L[1.2], the encoder 712 receives and encodes XML/PSOM contained conference activity from the data media conference unit 722. Examples of such activity include slides, annotations, whiteboard, and so forth.

In action L[1.3], the encoder 712 receives application sharing data from the application sharing media conference unit 723 and transcodes this include client compatible codec such as native-RDP, VC1, H.264 or a proprietary format. In one embodiment, the proprietary format is a time stamped frame based sparse tile referencing. The MBR is achieved by using frame dropping for basic transrating. Tile content (encoded as RLE/PNG/JPG format depending on encoding analysis) is packaged within the chunks to minimize HTTP request overhead. Tile references consist of a tile identifier and reference to origin chunk id containing the tile content for performance and to enable recording/seek late-join. Time/Bandwidth based sliding window is enforced on chunk back-referencing to constrain chunk referencing. Periodically, chunks are written with the first tile reference frame to be a 'keyframe' with a full tile reference description even though the tile content may be contained within prior chunks written within the sliding window limit. Additional HTTP GET operations required to obtain tile content required to render a full image frame is tolerated since discontinuity with respect to Audio/Video streams resulting from client possibly under buffering will be less noticeable and possible to compensate/recover from by varying playback on the client when content is available. Timestamps for all encoded modalities for a given conference are based on a common Encoder clock. By relying on clients to deal with discontinuity and varying playback speed of application sharing we can lower the priority (to some extent) of streaming application data relative to Audio.

In action L[1.4] other conference modalities provided by other media conference units 724 are received by the encoder 712.

The distribution and archiving process will now be described with respect to actions L[2.1] and L[2.2]. The encoder 712 of FIG. 7 acts as previously described with respect to the segmentation module 312 and encoding module 313 of FIG. 3 in generated encoded segments.

In action L[2.1], the encoder 712 stores and forwards content as encoded segments to persistent storage.

In action [L2.2], the encoder 712 servers encoded segments to chunk content servers 711, perhaps acting in an origin-proxy server configuration.

Third, the process of the conference participant computing systems 702A through 702E (referred to generally as "clients") requesting encoded segments by time-modality-bitrate and/or by time-common profile will be described with respect to actions L[3.1], L[3.2.1], L[3.2.2], L[3.3.1] and L[3.3.2].

In action L[3.1], clients 702A participating in small or fully hosted events request content via HTTP requests directly to the broadcasting conference service 701. These clients 702A thus may receive the requested encoded segments in a unicast manner similar to clients 102A and 102B of FIG. 1.

In action L[3.2.1], clients 702B participating in large and/or extended-events request content from a content distribution network 704B. Such clients 702B are analogous to the clients 102C and 102D of FIG. 1, where the content distribution network 704B may represent an example of the conference data caching computing system 104A of FIG. 1.

In action L[3.2.2], the content distribution network 704B pulls, caches, and serves encoded segments obtained from the chunk/content servers 711 in perhaps the same way a directly-connected client (L3.1) would.

In action L[3.3.1], clients 702C, 702D and 702E within a LAN/WAN are connected to the internet via proxy server(s) 704A.

In action L[3.3.2], proxy servers 704A HTTP GET content either directly from the chunk/content servers 711 or via the content distribution network 704B. Content cache HTTP response headers set by the chunk content servers 711 can be used as hints by the proxy servers 704A to passively cache content reducing bandwidth and/or load for the customer's LAN/WAN and the broadcasting conference service 701.

Next, the process of the conference participant computing system (or more specifically, the media transport library within that client) receiving, caching and queuing encoded segments for decoding and playout will be described with respect to action L[4]. In action L[4], the data/media transport layers internally maintain LRU downloaded chunk queues and priority based pending/downloading chunk queues. A heuristics algorithm on the client may use request start/end/source/size/modality/bitrate information obtained during session initiation to prioritize, drop, or retry encoded segment downloading. A change in the encoding settings (e.g., bitrate switching, modality adjusting decisions and notification of changes) occur as significant thresholds in network cpu performance are detected.

The process of the client processing decoding and playing out of encoded segments will now be described with respect to action L[5]. In action L[5], samples within the encoded segments are parsed by modality specific parsers/decoders for playout. Audio-visual segments may be decoded and pushed to a Silverlight Media pipeline via Custom MediaStreamSource. Application sharing segments may be decoded using a Silverlight RDP decoder. Data chunks may be decoded using an OCS/proprietary decoder.

The process of streaming recorded events will now be described with respect to actions R[1.1.1], R[1.1.2], R[1.2], R[2], R[3] and R[4].

In action R[1.1.1], clients request chunks for recordings in the same way they do for live events (see L[3.1], L[3.2.1], L[3.2.2], L[3.3.1] and L[3.3.2].

In action R[1.1.2], the chunk/content servers (maintaining in-memory, distributed-in-memory LRU) caches initially retrieve recording content from permanent storage. Fast-start, prefetching and batch reading operations can occur when accessing recording content.

In action R[2] The Event Service may optionally offload the task of serving recording content to the storage service depending on features implemented by the storage service, such as content access, authentication, transport security and performance SLAs.

In action R[3], regardless of how recorded content was requested, clients receive encoded segments similar to the manner described for action L[3.1], L[3.2.1], L[3.2.2], L[3.3.1] and L[3.3.2].

In action R[4], given R[3], downloading, processing, decoding and playout of the encoded segments occurs similar to the manner described for action L[5].

Having described the embodiments in some detail, as a side-note, the various operations and structures described herein may, but need, not be implemented by way of a computing system. Accordingly, to conclude this description, an example computing system will be described with respect to FIG. 8.

Figure 8:
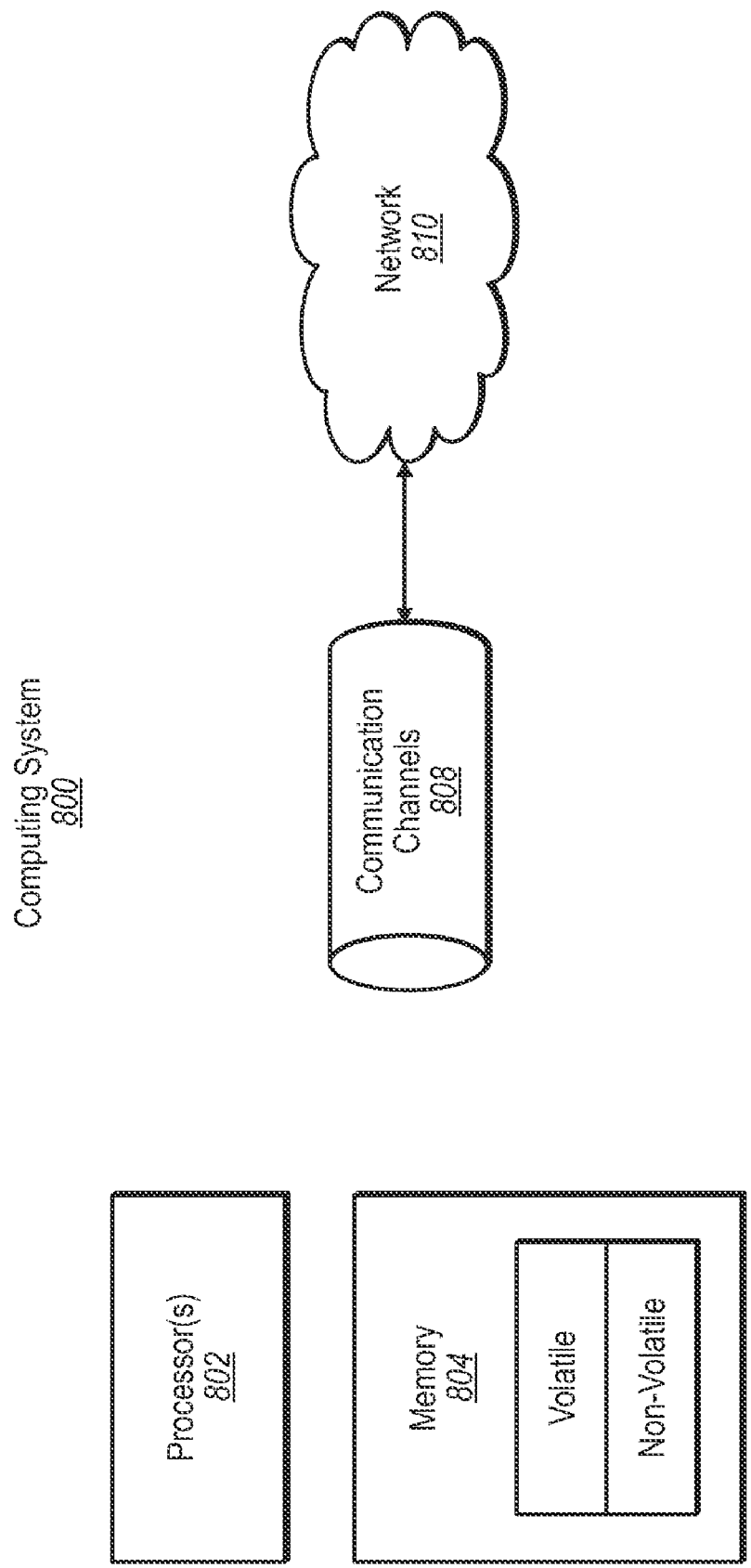
FIG. 8 illustrates a computing system architecture in which the principles described herein may be employed in some embodiments.

FIG. 8 illustrates a computing system 800. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any physical form and may depend on the nature and form of the computing system. A computing system may be distributed over a network environment and may include multiple constituent computing systems.

As illustrated in FIG. 8, in its most basic configuration, a computing system 800 typically includes at least one processing unit 802 and memory 804. The memory 804 is a physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description above, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 804 of the computing system 800.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other physical medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A physical conferencing data distributed system, comprising:
   a conference data dispatch system;
   a plurality of conference participant computing systems that each include one or more processors; and
   a plurality of network distribution paths of a network, the plurality of network distribution paths connecting the conference display system and the plurality of conference participant computing systems;
   a conferencing data caching system that is interposed between the conference data dispatch system and a subset of the plurality of conference participant computing systems, the subset including a first conference participant computing system of a first type and a second conference participant computing system of a second type;

wherein the conference data dispatch system comprises:

a conference data identification module that is structured to identify conference data that represents a physical conference being held between physical conference participants, at least some of the physical conference participants attending the physical conference via the network using the plurality of conference participant computing systems, the conference data including video data, audio data, and application data that is generated as a result of the execution of the physical conference;

a segmentation module that is structured to segment the conference data into a plurality of segments, including segmenting the video data, the audio data, and the application data into the plurality of segments;

an encoding module that is structured to:
(i) encode the conference data, including encoding each of the plurality of segments into a plurality of encoded segments using different encoding settings for each encoded segment, such that each of the plurality of segments is encoded into at least (a) a first corresponding encoded segment using first encoding settings for the first type of participant computing system, the first encoding settings using a first key corresponding to the first conference participant computing system for encrypting the first corresponding segment; and (b) a second corresponding encoded segment using second encoding settings for the second type of participant computing system, the second encoding settings refraining from encrypting the second corresponding encoded segment, and
(ii) use a manifest to identify the different encoding settings, the manifest being modifiable during the transmission of the conference data from the conference data dispatch system to the plurality of conference participant computing systems to vary the encodings which are used to encode the plurality of segments into the plurality of encoded segments;

a matching module that is structured to identify which of the plurality of encoded segments to flow to each of the plurality of conference participant computing systems, including identifying that, for each of the plurality of segments, first corresponding encoded segments that were encoded using the first settings are to be flowed to the first conference participant computing system and second corresponding segments that were encoded using the second settings are be flowed to the second participant computing systems; and a distribution module that is structured to:
(i) cause the plurality of encoded segments to be flowed to the plurality of conference participant computing systems as identified by the matching module,
(ii) send the manifest to the plurality of conference participant computing systems to enable each of the conference participant computing systems to select particular encoding settings with which the conference data transmitted to the conference participant will be encoded, and
(iii) cause at least some of the identified encoded segments, including those encoded with the first encoding, to be flowed to the conference data caching system; and wherein the conferencing data caching system comprises:
a conference data intake module that is structured to receive encoded segments that were flowed from the conference data dispatch system to the subset of conference participant computing systems, including receiving first corresponding encoded segments that were encoded using the first encoding settings and second corresponding encoded segments that were encoded using the second encoding settings;

a caching determination module that is structured to determine for each received encoded segment, whether or not to cache the encoded segment;

a caching module that is structured to cache each received encoded segment that is determined by the caching determination module to be cached; and a dispatch module that is structured to dispatch at least some of the received encoded segments to a corresponding conference participant computing system further along the particular network distribution path, including dispatching the first corresponding encoded segments that were encoded using the first encoding settings to the first conference participant computing system and dispatching the second corresponding encoded segments that were encoded using the second encoding settings to the second conference participant computing system.

2. The physical conferencing data distributed system in accordance with claim 1, wherein the application data comprises an electronic slide deck.

3. The physical conferencing data distributed system in accordance with claim 1, wherein the application data comprises application sharing data.

4. The physical conferencing data distributed system in accordance with claim 1, wherein the application data comprises electronic white board session data.

5. The physical conferencing data distributed system in accordance with claim 1, wherein the application data comprises electronic questions and answers session data.

6. The physical conferencing data distributed system in accordance with claim 1, wherein an encoding setting comprises a bit rate setting.

7. The physical conferencing data distributed system in accordance with claim 1, wherein an encoding setting comprises a destination display setting.

8. The physical conferencing data distributed system in accordance with claim 7, wherein the destination display setting comprises a panoramic display capability setting.

9. The physical conferencing data distributed system in accordance with claim 1, wherein the distribution module causes an identified encoded segment to be flowed to a particular one of the plurality of conference participant computing systems in response to a request from the particular conference participant computing system.

10. The physical conferencing data distributed system in accordance with claim 1, wherein the distribution module causes an identified encoded segment to be flowed to one of the plurality of conference participant computing systems by flowing the identified encoded segment to an intermediary computing system of the conference participant computing system in response to a request from the intermediary computing system.

11. The physical conferencing data distributed system in accordance with claim 1, wherein at least some of the encoded segments of at least some of the plurality of segments are cacheable by an intermediary computing system that is in a path of distribution between the distribution module and at least some of the conference participant computing systems.

12. The physical conferencing data distributed system in accordance with claim 1, wherein the conferencing data comprises an electronic slide deck, application sharing data, and electronic white board session data.

* * * * *